(12) United States Patent
Wang et al.

(10) Patent No.: US 10,075,514 B2
(45) Date of Patent: Sep. 11, 2018

(54) SCALABLE MONITORING OF LONG RUNNING MULTI-STEP DATA INTENSIVE WORKLOADS

(71) Applicant: VMware, Inc., Palo Alto, CA (US)

(72) Inventors: Bin Wang, San Jose, CA (US); Ilia Langouev, Santa Cruz, CA (US); Aleksey Pershin, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 335 days.

(21) Appl. No.: 14/839,891

(22) Filed: Aug. 28, 2015

(65) Prior Publication Data

US 2017/0063974 A1 Mar. 2, 2017

(51) Int. Cl.
| | | |
|---|---|---|
| *G06F 15/173* | (2006.01) | |
| *H04L 29/08* | (2006.01) | |
| *H04L 12/26* | (2006.01) | |
| *G06F 9/00* | (2006.01) | |
| *H04L 12/24* | (2006.01) | |

(52) U.S. Cl.
CPC .......... *H04L 67/1002* (2013.01); *G06F 9/00* (2013.01); *H04L 43/06* (2013.01); *H04L 41/042* (2013.01)

(58) Field of Classification Search
USPC ................. 709/224, 204; 455/223; 370/346; 379/112.01
See application file for complete search history.

(56) References Cited

U.S. PATENT DOCUMENTS

| | | | | |
|---|---|---|---|---|
| 7,457,400 B1* | 11/2008 | Fries | ..................... | H04L 67/36 379/112.01 |
| 7,577,669 B1* | 8/2009 | Fries | ..................... | H04M 3/36 |
| 7,649,985 B1* | 1/2010 | Fries | .................. | H04L 41/0896 379/112.01 |
| 7,680,257 B1* | 3/2010 | Fries | .................. | H04M 3/2245 379/112.01 |
| 8,176,184 B2* | 5/2012 | Staack | ................ | H04L 65/1006 709/204 |
| 8,543,536 B1* | 9/2013 | Fries | ..................... | H04M 3/367 379/112.06 |
| 2003/0046396 A1* | 3/2003 | Richter | ................... | G06F 9/505 709/226 |
| 2003/0152059 A1* | 8/2003 | Odman | .................... | H04B 1/69 370/338 |
| 2008/0279171 A1* | 11/2008 | Kim | ..................... | H04L 1/1685 370/346 |
| 2012/0322432 A1* | 12/2012 | Biernat | ................... | H04L 41/00 455/418 |

(Continued)

OTHER PUBLICATIONS

Unknown, "RabbitMQ"; accessed from <http://www.rabbitmq.com/> on Aug. 27, 2015, Pivotal Software, 1 page.

(Continued)

*Primary Examiner* — Tammy Nguyen (57) ABSTRACT

Examples perform monitoring of multiple-step, concurrently executed workflows across distributed nodes. Requests from an intermediate node are classified by a load balancer as monitoring or non-monitoring. Non-monitoring requests are handled by any node; however, monitoring requests are distributed to all nodes via a plurality of queues but handled only by nodes executing the subject workflow. The load balancer receives reports from any node executing the subject workflow, and passes the first report to the intermediate node.

14 Claims, 9 Drawing Sheets

(56) References Cited

U.S. PATENT DOCUMENTS

2014/0337071 A1* 11/2014 Stiffler .............. G06Q 10/06311
705/7.13
2015/0082464 A1* 3/2015 Terashita ................ G06F 21/60
726/28

OTHER PUBLICATIONS

Unknown, "Documentation"; Redis; accessed from <http://redis.io/documentation> on Aug. 27, 2015, 4 pages.
Unknown, "Distributed Locks with Redis"; Redis; accessed from <http://redis.io/topics/distlock> on Aug. 27, 2015, 7 pages.

* cited by examiner

SCALABLE MONITORING OF LONG RUNNING MULTI-STEP DATA INTENSIVE WORKLOADS

BACKGROUND

Some existing systems provide monitoring during execution of workflows on distributed nodes. For example, some systems permit monitoring during disaster recovery of virtual machines (VMs) operating in cloud environments. In some systems, monitoring the implementation of workflows across multiple management nodes is performed through a special workflow monitoring user interface (UI).

However, existing methods do not scale out effectively. For example, a recovery workflow may contain 5-10 tasks for each VM. Consequently, a recovery workflow for a recovery plan with 1,000 VMs would contain 5,000 to 10,000 tasks, and each task produces periodic progress updates and a final succeeded/failed status update. In order to scale out, some cloud services use an eventually consistent database to persist data. But this kind of database lacks support for conditional based queries, such as structured query language (SQL) relation databases. For example, if a workflow has 5000 tasks, the database table has 5000 rows. Each row stores the name, progress, start time, etc., for each task. Since it is not possible to query the database for specific rows, each node in the cluster has to load all the rows into memory and perform in-memory filtering. This solution does not work well for workflow monitoring because the workflow monitoring data takes a very substantial amount of memory for each node.

Furthermore, due to the nature of eventual consistency, each management node could get a slightly different view of the database table depending on which node in the cluster from which it reads the data. This could result in the monitoring user interface (UI) receiving inconsistent and fluctuating responses to the monitoring requests to the server. As a result, the workflow monitoring UI may display inconsistent and fluctuating information.

SUMMARY

In some examples, multi-step workflows are monitored by a plurality of management nodes. A monitoring request is received from a load balancer. An execution identifier (ID) of the monitoring request is compared to an execution ID of a workflow currently executing on the management nodes. If the execution IDs are not the same, the monitoring request is disregarded. Otherwise, the monitoring request is performed, and a report is sent to the load balancer on a status of the workflow on the object.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Monitoring the execution of simultaneous workflows across multiple nodes is resource intensive. Intermediate nodes transmit requests, both for workflow execution status information and for workflow execution, to management nodes via queues. The management nodes execute the workflows and provide reports back to the intermediate node on workflow execution status. Existing systems distribute both types of requests (e.g. non-monitoring and monitoring) in a round-robin fashion to random management nodes operating in the system.

Because each management node operates independently, it is unaware of the workflow execution status of any workflow which that management node is not executing. Consequently, to respond to a request monitoring workflow execution status, any given queried management node must access the database to determine the status of a workflow execution which that management node is not associated with. After accessing the requested information, the management node then reports to the intermediate node. However, this existing method requires loading data from the database each time a monitoring query is made, consuming resources and slowing monitoring reports.

Examples described herein provide a system for monitoring concurrent workflow execution across distributed nodes. On-premises and remote datacenters have the potential to support thousands of virtual machines (VMs) simultaneously. The clusters of nodes operating on the datacenters, in turn, execute a plurality of workflows. Each workflow is associated with a plurality of VMs.

In some examples described herein, a load balancer sorts requests from an intermediate into monitoring and non-monitoring requests. While non-monitoring requests are distributed to only a single management node, the monitoring requests are distributed to all of the management nodes via a plurality of monitoring queues. Each management node then determines whether the monitoring request applies to that management node or not. If the management node is executing the workflow which is the subject of the monitoring request, then the management node sends a report back to the intermediate node via the load balancer. Each management node executes its workflow in-memory, and thus a query regarding the workflow execution state does not require accessing any database or other logical storage system. By avoiding querying the database and/or loading data from the database, requests are more quickly processed, and less processing and storage resources are consumed.

To facilitate the monitoring of distributed nodes during the execution of concurrent workflows, examples described herein provide a load balancer to route requests from an intermediate node to the management nodes via message queues depending on the different type of requests (e.g., requests relating to monitoring workflows, and those which do not relate to monitoring workflows). The disclosed examples further use a request filter operating on each management node to determine which management nodes should process received requests. The load balancer filters the responses from the management nodes, reporting only the first applicable report to the intermediate node. The method has several benefits such as low resource consumption, fast to report, and more. Further, the disclosed method is effective at large data processing and monitoring in cloud services.

Aspects of the disclosure further enable increasing speed in processing monitoring requests because only the management nodes which are operating the workflow respond to requests, and the load balancer transmits only the first report to the intermediate nodes, filtering out all later received reports. Likewise, the disclosure conserves memory and reduces processor load, because less information is transmitted, displayed, and stored by the load balancer and intermediate nodes.

Examples of the disclosure improve user efficiency via an improved UI experience. Because the load balancer and individual management nodes provide back-end filtering, the UI is populated with fewer, but more meaningful entries. Queries promulgated by a user are more rapidly processed, and the UI is more quickly updated. This improves the user interaction performance of the system, overall, by providing the user with more timely, accurate monitoring information. The system allows for scaling out on a much greater scale than previously disclosed systems.

Figure 1:
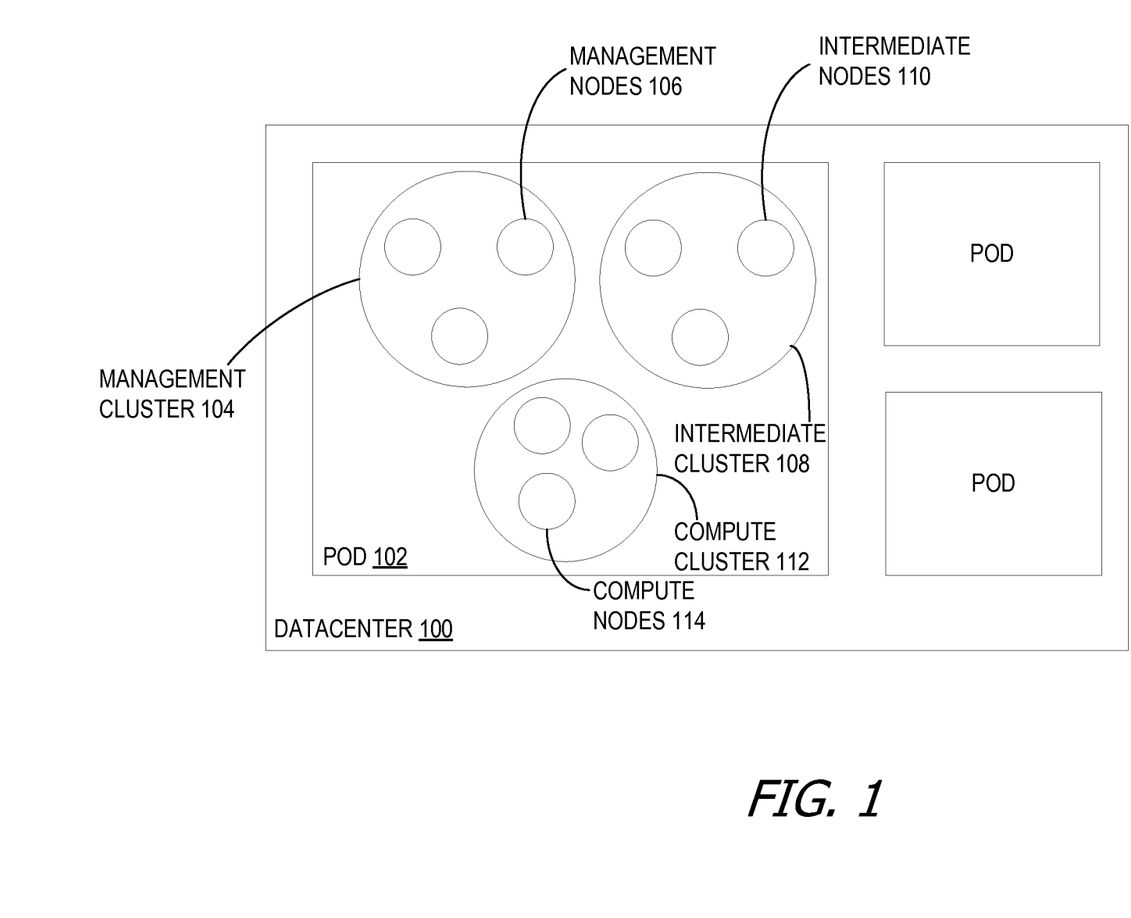
FIG. 1 is a block diagram of an exemplary architecture for performing long running multi-step data intensive workloads.

FIG. 1 is a block diagram of an exemplary architecture for performing long running multi-step data intensive workloads. The workloads are, in some examples, performed by objects associated with an on-premises or cloud-based datacenter 100, backed by physical computing resources. Each datacenter 100 is split into multiple pods 102. Each pod 102 contains a number of clusters. In the illustrated example, there are three clusters: a compute cluster 112, a management cluster 104, and an intermediate cluster 108.

Each cluster is populated by a plurality of nodes. The management cluster 104 contains a plurality of management nodes 104. In some examples, the management nodes are Site Recovery Manager Air (SRM Air) nodes, by VMware, Inc. Each management cluster 104 is, in some examples, backed by a database cluster containing multiple nodes. The compute cluster 114 contains several compute nodes 114. In some examples, the compute cluster 114 also contains a compute server, such as the Host Based Replication Management Server (HMS) by VMware, Inc., which manages replication to and from the datacenter 100. The pod 102 also contains intermediate clusters 108, which contain a plurality of intermediate nodes 110 such as Hybrid Cloud Services (HCS) or vCloud Director (VCD) cells, by VMware, Inc. In some examples, the intermediate nodes 110 receive responses from the management nodes 106 via the load balancer 202 and monitoring queues 206. The responses from the management nodes 106 are, in some examples, displayed and updated on a user interface. All servers and infrastructure components in a pod 102 are shared among all tenants assigned to this pod. Each pod is, in some examples, designed to handle hundreds of tenants running thousands of VMs simultaneously.

Figure 2:
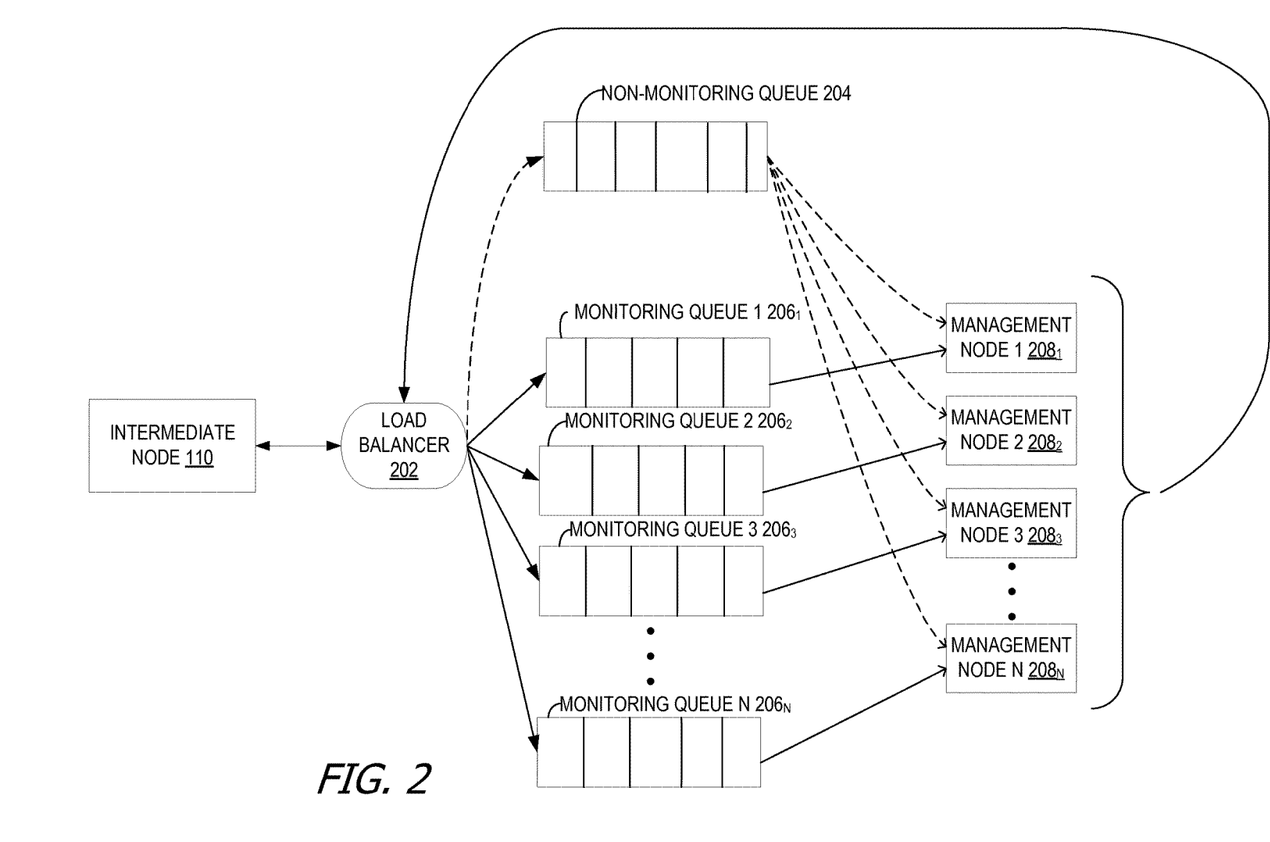
FIG. 2 is a block diagram of an exemplary architecture for monitoring long running multi-step data intensive workloads utilizing a load balancer and a plurality of monitoring queues associated with a plurality of management nodes.

FIG. 2 is a block diagram of an exemplary architecture for monitoring long running multi-step data intensive workloads utilizing a load balancer and a plurality of monitoring queues associated with a plurality of management nodes 106. In the example of FIG. 2, the intermediate node 110 communicates requests to a load balancer 202. The load balancer 202, in some examples, is a message broker implementing a representational state transfer (REST) application programming interface (API) (e.g., SystemExchange-hcs.api.extension). The load balancer 202 classifies the requests. In some examples, the requests are classified as either monitoring requests or non-monitoring requests. Classification of the requests is based, in some examples, on the request payload or the uniform resource locator (URL) extension.

Monitoring requests query the status of the workflow execution node performing the workflow. Non-monitoring requests include, for example, requests to process a workflow, or for any other operations aside from monitoring. A non-monitoring request, in some examples, is comprised of a workflow (e.g., a series of operations), an execution identifier (ID), and a set of VMs associated with the workflow. The load balancer 202 transmits the requests to a plurality of queues based on the classification of the requests. Non-monitoring requests are, in some examples, transmitted to a single non-monitoring queue 204 which is associated with all of the management nodes 106. Monitoring requests are transmitted to a plurality of monitoring queues $206_1$ through $206_N$. Each monitoring queue 206 is associated with a single management node 106, in a plurality of management nodes $106_1$ through $106_N$. In the illustrated example, the output of the management nodes 106 is transmitted back to the load balancer 202. The load balancer 202 communicates the transmitted reports to the intermediate node 110 via a queue or other data structure.

Figure 3:
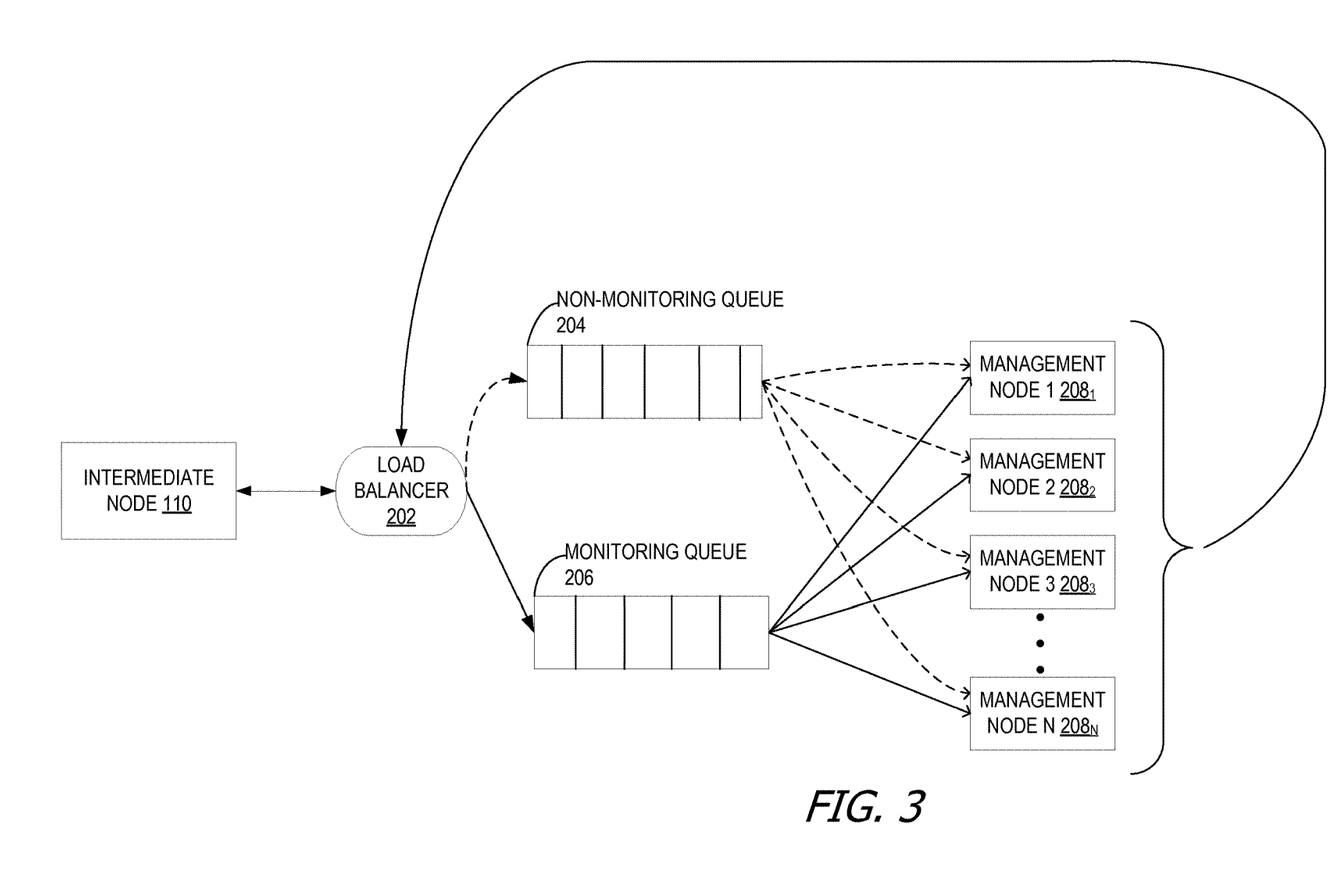
FIG. 3 is a block diagram of an exemplary architecture for monitoring long running multi-step data intensive workloads utilizing a load balancer and a single monitoring queue associated with a plurality of management nodes.

FIG. 3 is a block diagram of an exemplary architecture for monitoring long running multi-step data intensive workloads utilizing a load balancer and a single monitoring queue associated with a plurality of management nodes. In the example of FIG. 3, the intermediate node 110 communicates requests from the intermediate node 110 to a load balancer 202. The load balancer 202 classifies the requests, and transmits them to a plurality of queues based on the classification. Non-monitoring requests are, in some examples, transmitted to a single non-monitoring queue 204 which is associated with all of the management nodes 106. Monitoring requests are transmitted to a single monitoring queue 206. The single monitoring queue 206 transmits all of the monitoring requests to all of the plurality of management nodes $106_1$ through $106_N$. In some examples, management nodes 106 are selected to receive requests through a round-robin selection method, in accordance with an algorithm, by selecting the most idle management node 106, etc. In the illustrated example, the output of the management nodes 106 is transmitted back to the load balancer 202. The load balancer 202 communicates the transmitted reports to the intermediate node 110 via a queue or other data structure.

Figure 4:
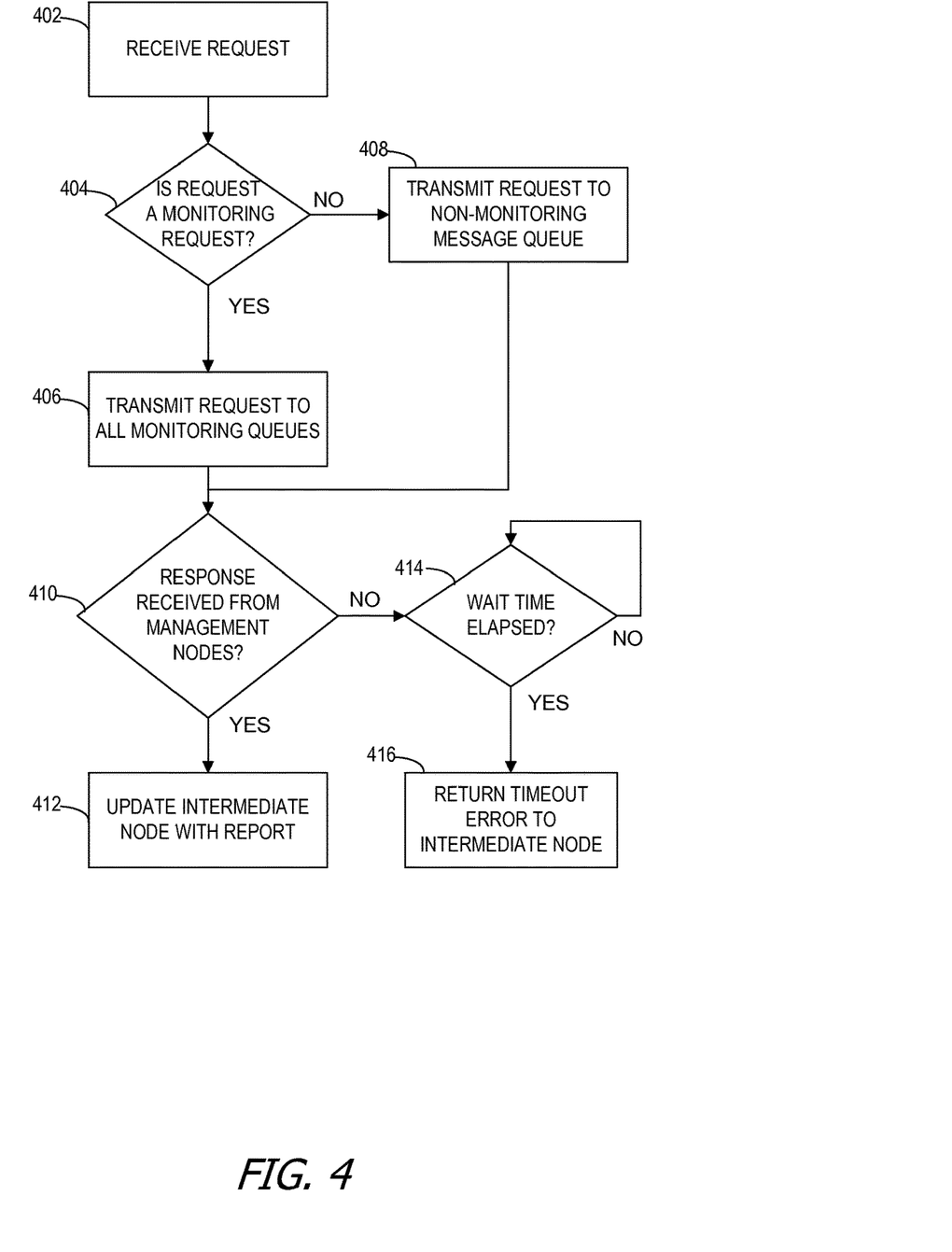
FIG. 4 is a flowchart of an exemplary method of monitoring long running multi-step data intensive workloads performed by a load balancer to divide requests between monitoring and non-monitoring request, to assign the requests to the appropriate queues, and to receive reports from the management nodes.

FIG. 4 is a flowchart of an exemplary method of monitoring long running multi-step data intensive workloads performed by a load balancer 202 to divide requests between monitoring and non-monitoring request, to assign the requests to the appropriate queues 204 and 206, and to receive reports from the management nodes 106 performing the requests. At 402 the load balancer 202 receives requests from the intermediate nodes 110. In some examples, a load balancer 202 receives requests from multiple intermediate nodes 110. In other examples, the load balancer 202 only receives requests from a single intermediate node 110. At 404, the load balancer 202 determines whether the request is a monitoring request or a non-monitoring request. A non-monitoring request includes, for example, operations associated with a workflow such as disaster recovery operations, migration operations, replication operations, etc. The load balancer 202, in some examples, evaluates whether the request is a monitoring request or a non-monitoring request by examining the request payload or URL extension. In some examples this is performed via an API. A monitoring request is, in some examples, generated by a user, on-demand, at set intervals, in response to an event, or in accordance with a policy. In some examples, a monitoring request is generated whenever a workflow is complete, at the initiation of a workflow, in response to a change in available processing resources, in response to the loss of a datacenter, etc.

If the request is a non-monitoring request, at 408 the request is transmitted to the non-monitoring message queue 204. The non-monitoring message queue 204 is associated with all of the management nodes 106 (as illustrated in FIGS. 2 and 3), and the request is assigned to a management node 106. In some examples, requests are assigned, transmitted, or otherwise passed by the non-monitoring queue 204 to the appropriate management node 106. However, in other examples all of the management nodes 106 listen to the non-monitoring queue 204, but only one management node 106 acts on each non-monitoring request. In some examples, the request is assigned in accordance with a policy established by an administrator, for instance to the most idle management node 106. In other examples, the request is assigned to a management node 106 in accordance with a selection process such as round robin, random, etc.

However, if the request is a monitoring request, it is transmitted to the monitoring queues 206 at 406. In some examples, such as illustrated in FIG. 2, there is one monitoring queue 206 for each management node 106. In that example, all the monitoring queues 206 receive the request. In other examples, only one monitor queue 206 exists for all of the management nodes 106 (illustrated in FIG. 3), and the single monitoring queue 206 distributes the request to all of the management nodes 106. The monitoring and non-monitoring queues are, in some examples, established via an API.

At 410, the load balancer 202 receives the reports to the requests from the management nodes 106. The operations performed by the management nodes 106 in handling and responding to the requests are illustrated and described in FIG. 5. Once the first report is received from any of the management nodes 106, the load balancer 202 updates the intermediate node 110 with the report. Subsequent, duplicate reports from other management nodes 106 are discarded by the load balancer 202.

If no reports are received by the load balancer 202 at 410, the load balancer 202 continues to wait for a proscribed amount of time at 414. This wait time, in some examples, is defined by an administrator, or the wait time is established in relation to the average report time previously recorded. For example, all report times are monitored, the average report time is calculated, and a wait time is defined as the average report time plus one standard deviation. If the wait time has not elapsed, the load balancer continues to wait for reports. However, once the wait time has elapsed, the load balancer 202 returns a timeout error to the intermediate node at 416.

Figure 5:
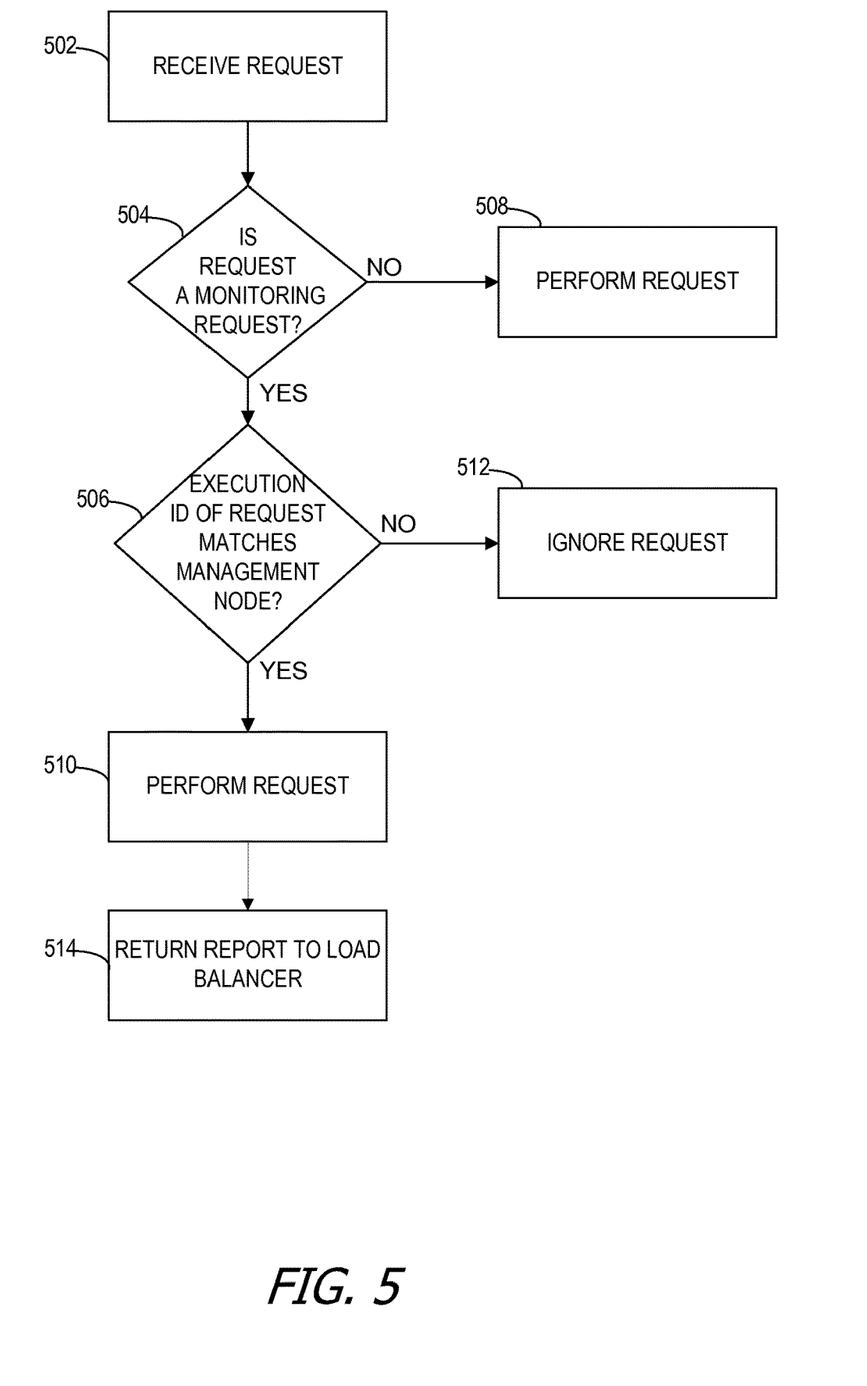
FIG. 5 is a flowchart of an exemplary method of monitoring long running multi-step data intensive workloads performed by a plurality of management nodes to receive monitoring and non-monitoring requests and to handle and respond to the requests.

FIG. 5 is a flowchart of an exemplary method of monitoring long running multi-step data intensive workloads performed by a plurality of management nodes 106 to receive monitoring and non-monitoring requests and to handle and respond to the requests. At 502, an individual management node 106 receives a request from either the non-monitoring queue 204 or the monitoring queue 206. If the request is from the non-monitoring queue 204, then only a single management node 106 receives the request, in some examples. However, if the request is promulgated by the one or more monitoring queues 206, then in parallel all of the management nodes 106 associated with the workflow receive the request and perform the operations illustrated in FIG. 5 and described herein.

At 504, if the request is a non-monitoring, then the management node 106 performs the request at 508. In some examples, the management node 106 processing the workflow associated with the request maintains the workflow state only in memory, without storing the workflow in the database. Consequently, any subsequent monitoring request received by a management node 106 operating a workflow is only required to access the workflow execution state maintained in the memory in order to generate the appropriate report. Performing the non-monitoring request, in some examples, also involves storing the execution ID of the workflow (or node performing the processing). The execution ID is stored, in some examples, in a table, database, array, index, etc.

If the request is a monitoring request, then the management node 106 determines whether the request applies to it, or not at 506. To determine if the request applies to the management node 106, the management node 106 evaluates the execution ID associated with the request. The execution ID identifies a workflow transmitted by an intermediate node. The workflow, in some examples, includes not only an execution ID, but also a series of operations. Each workflow has a unique execution ID (e.g., unique among the workflows), in some examples this is assigned by the compute node 114 when the workflow is executed. The execution ID is retrieved, in some examples via an API (e.g., GetExecutionID). If the execution ID of the request matches the execution ID of the workflow running on the management node 106, then the management node 106 is handling the request, and is, in some examples, referred to as a handling management node 106. If the execution ID of the request does not match the execution ID of the workflow operating on the management node 106, then that node is a non-handling management node 106 for that request.

At 512 a non-handling management node 106 ignores the request, and performs no other operations. However, a handling management node performs the transmitted monitoring request at 510. In some examples, performing the request entails retrieving information about the handling management node 106, the current operation, time spent on each operation, time spent on the workflow, operations remaining, etc. To respond to a monitoring request, the management node 106 accesses the associated memory, where the workflow execution state is stored. At 514, the handling management node 105 returns a report to the load balancer 202. The report includes, in some examples, the information retrieved in the request. In other examples, the report includes a timeout error, a general error, or a report that the queried operation or workflow was already performed. The load balancer 202 processes the report as illustrated and described in FIG. 4, above. However, if the load balancer 202 does not receive any report for a monitoring request within a given timeout, it assumes, in some examples, that either that the request is invalid or the management node 106 that was processing the workflow has died. In either case, the load balancer 202 returns an error to the intermediate node 110.

Figure 6:
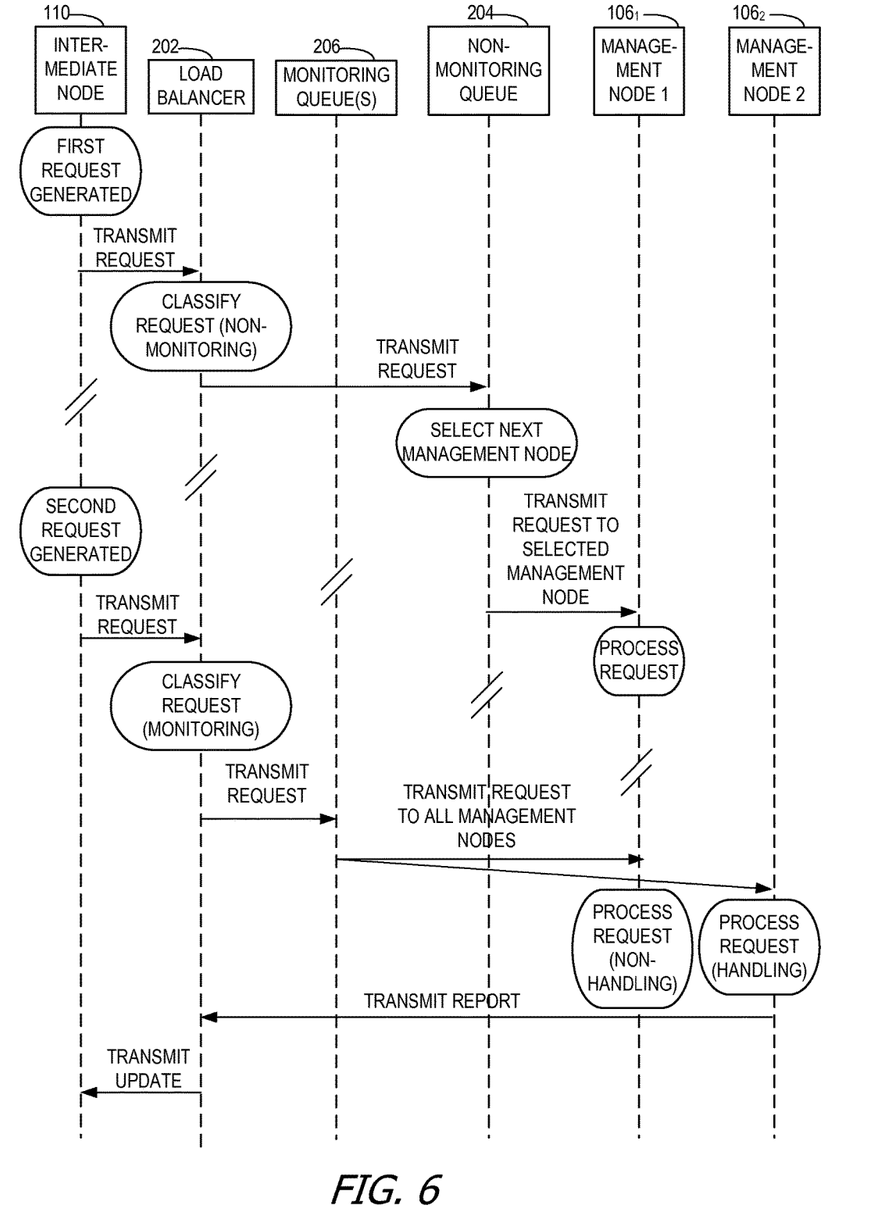
FIG. 6 is a sequence diagram of an exemplary sequence of operations during the monitoring of long running multi-step data intensive workloads performed by an intermediate node, a load balancer, a monitoring queue, one or more non-monitoring queues, and a plurality of management nodes.

FIG. 6 is a sequence diagram of an exemplary sequence of operations during the monitoring of long running multi-step data intensive workloads performed by an intermediate node 110, a load balancer 202, one or more monitoring queues 206, a non-monitoring queue 204, and a plurality of management nodes 106.

The intermediate node 110 initially generates a request. In some examples, the request is generated in response to user input, for example a user query or user initiation of a workflow. In other examples, the request is generated periodically, or in response to some other event such as completion of a workflow, an error message, a timeout message, a disaster event, a request for live migration, etc. The intermediate node 110 transmits the request to the load balancer 202. The load balancer then classifies the request as a monitoring or non-monitoring request, in some examples by examining the extension of the request.

In the first illustrated sequence, the first request is classified as a non-monitoring request, and thus only transmitted to the non-monitoring queue 204. The non-monitoring queue 204 selects the next management node 106 for processing requests and transmits the request to that management node 106. Although in this sequence the load balancer 202 transmits the request to management node 1, the request is transmitted to whichever management node 106 the load balancer 202 selects. In some examples, the selection is made in a round robin method, randomly, by selecting which management node 106 is most idle, or some other method. The selected management node 106 processes the request, and no further actions are required.

In the second illustrated sequence, the second request generated is classified as a monitoring request by the load balancer 202. The load balancer 202 transmits the monitoring request to the one or more monitoring queues 206. The monitoring queues 206, in turn, transmit the request to all of the management nodes 106. Each management node then processes the request, in accordance with the method described and illustrated in FIG. 5. In the sequence illustrated in FIG. 6, only management node 2 $106_2$ is considered a handling management node 106. However, all management nodes 106 receive and process monitoring requests from the load balancer 202 simultaneously and in parallel. Consequently, in some examples, only management node 2 $106_2$ generates a report, which it transmits to the load balancer 202. The load balancer 202 updates the intermediate node 110 with the report. The sequence continues, with requests handled by the management nodes 106 in accordance with the method illustrated and described in FIG. 5.

Figure 7:
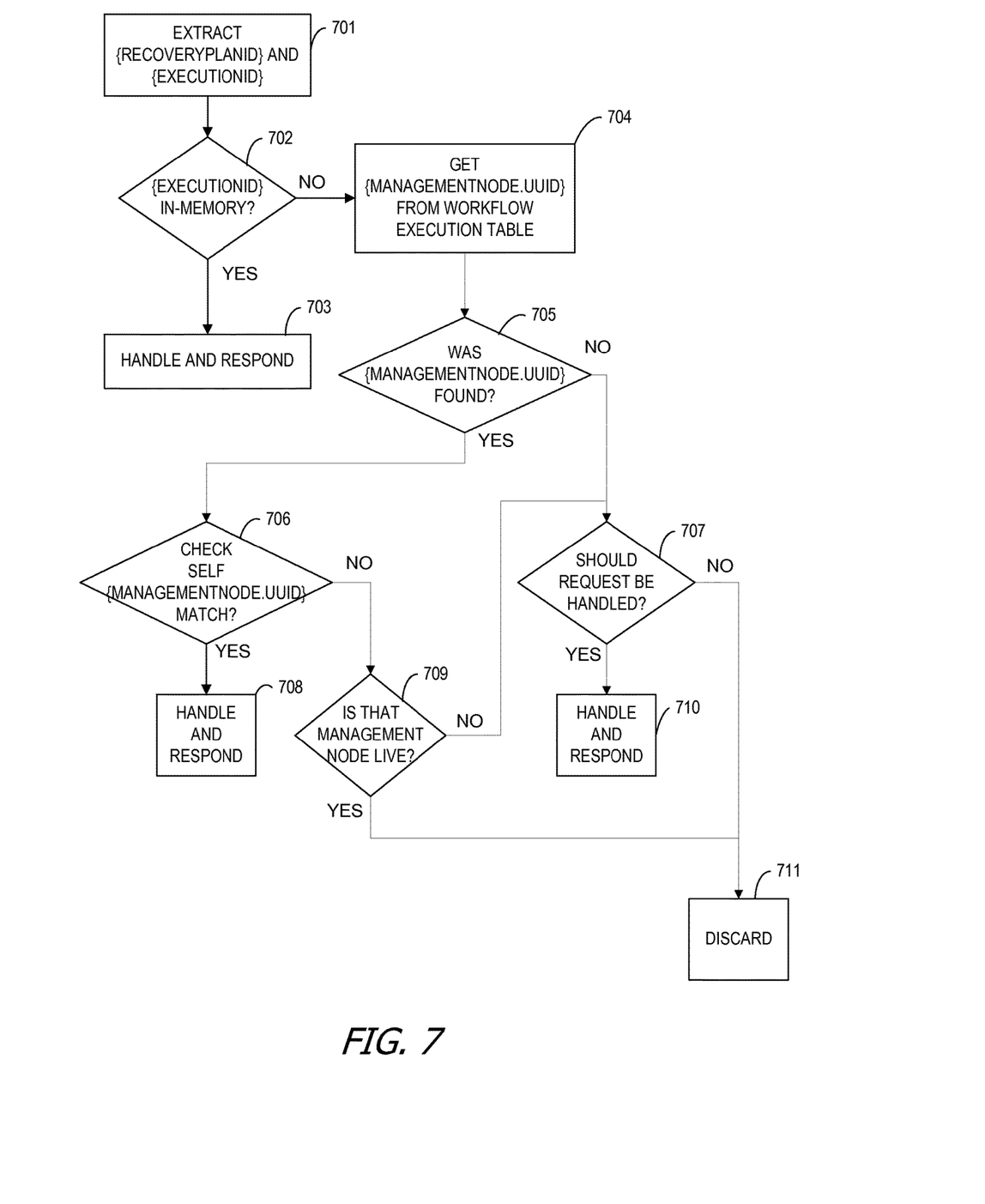
FIG. 7 is a block diagram of an exemplary workflow performed by the disclosed exemplary architecture illustrated in FIGS. 1, 2, and 3.

FIG. 7 is a block diagram of exemplary workflow paths performed by the disclosed exemplary architecture illustrated in FIGS. 1, 2, and 3. The exemplary workflow paths are described as being performed by handling and non-handling management nodes 106. A handling management node 106 is a management node 106 which receives a monitoring request which applies to that management node 106. A non-handling management node 106 is a management node 106 which receives a monitoring request, but the monitoring request does not apply to the management node 106. Although the examples are described as being performed by handling and non-handling management nodes 106, whether a management node 106 is a handling management node 106 or a non-handling management node 106 is not determined until after the management node performs the operations illustrated in FIG. 5. Further, management nodes 106 are classified as handling or non-handling for descriptive purposes. Management nodes 106 need not be identified as handling or non-handling under the method described herein.

Successful Monitoring Path During Execution

In a successful monitoring path, the handling node follows the following workflow: at 701 the handling management node 106 extracts the {ExecutionID} values from the request transmitted by the load balancer 202 via the monitoring queue 206. In some examples the {ExecutionID} are extracted via an API (e.g., GetExecutionIDFromRequest). If the {ExecutionID} from the request is in the memory associated with the handling management node 106, then the monitoring request is applicable to that management node 106 and that workflow is currently being performed by the handling management node 106. In that example, the request is handled by the management node 106, and a report responsive to the request is sent to the intermediate node 110 via the load balancer 202 at 703. In some examples, the report indicates which operation the handling management node 106 is currently performing, the time spent on the current operation, completed operations, remaining operations, time spent on the workflow, etc.

For non-handling management nodes 106, in a successful monitoring path, the non-handling management nodes 106 also receive the monitoring request from the load balancer 202 via the monitoring queue 206. At 701, the non-handling management nodes 106 also extract the {ExecutionID} from the request at 701. At 702, the non-handling management node 106 searches for the {ExecutionID} in the memory associated with the non-handling management node 106. When the {ExecutionID} is not located in the memory, the non-handling management node 106 retrieves the {MANAGEMENTNODE.UUID} for that workflow from a workflow execution table. The {MANAGEMENTNODE.UUID} is an ID unique to each workflow execution (e.g., associated with a managementnode), and it is established during deployment of the workflow. In some examples, the {MANAGEMENTNODE.UUID} is retrieved via an API (e.g., GetExecutionNodeIDbyExecutionID). If the {MANAGEMENTNODE.UUID} is located at 705, the non-handling management node 106 compares the retrieved {MANAGEMENTNODE.UUID} to the {MANAGEMENTNODE.UUID} associated with the non-handling management node 106 at 706. In this example path, the {MANAGEMENTNODE.UUID} of the retrieved workflow does not match the {MANAGEMENTNODE.UUID} associated with the non-handling management node, then the non-handling management node 106 determines whether the appropriate, handling management node 106 associated with that {ExecutionID} is live at 709. In this example, the appropriate, handling management node 106 is live, and the non-handling management node discards the request at 711.

Monitoring Path after Execution is Complete or Execution Crashed and Node Restarted At 701, both the handling and non-handling management nodes 106 extract the {ExecutionID} from the request transmitted by the load balancer 202 via the monitoring queue 206. In this workflow, the {ExecutionID} from the request is not in the memory associated with either the handling or the non-handling management nodes 106 at 702. In some examples, this is because neither the handling nor the non-handling management nodes 106 are currently performing the operations associated with that workflow since it has completed execution. In other examples, this could be because the execution of the workflow has crashed, and the node has been restarted but has not yet begun performing the workflow. Since the {ExecutionID} is not in memory for the management nodes 106, both the non-handling and handling management nodes 106 retrieve the {MANAGEMENTNODE.UUID} from the workflow execution table at 704. In the workflow for a successfully completed monitoring path, the {MANAGEMENTNODE.UUID} is found by both the non-handling and handling management nodes 106 at 705, and the management nodes 106 then check to see whether the retrieved {MANAGEMENTNODE.UUID} matches the {MANAGEMENTNODE.UUID} of that management node 106 at 706.

At this point, the workflow from the non-handling and handling management nodes 106 diverges. The workflow for management nodes 106 which successfully handled the request previously determines whether the {MANAGEMENTNODE.UUID} of the management node 106 matches the retrieved {MANAGEMENTNODE.UUID}. Consequently, the handling management node 708 handles the request and responds at 708. In some examples, responding to the request includes indicating the time spent on the workflow, time spent on each operation in the workflow, etc.

For non-handling management nodes 106, the retrieved {MANAGEMENTNODE.UUID} does not match the {MANAGEMENTNODE.UUID} associated with the management node 106 at 706. In that example, the non-handling management node 106 determines whether the management node 106 which would have handled the workflow associated with that {ExecutionID} is live at 709. In this example, the appropriate, handling management node 106 is live (e.g., its workflow is described in the previous paragraph), and the non-handling management node discards the request at 711.

Monitoring Path after Execution Crashed and Node is not Restarted

At 701, both the handling and non-handling management nodes 106 extract the {ExecutionID} values from the request transmitted by the load balancer 202 via the monitoring queue 206. In this workflow, the {ExecutionID} from the request is not in the memory associated with either the handling or the non-handling management nodes 106 at 702. In some examples, this is because neither the handling nor the non-handling management nodes 106 are currently performing the operations associated with that workflow since the handling management node 106 crashed during execution. Since the {ExecutionID} is not in memory for the management nodes 106, both the non-handling and handling management nodes 106 retrieve the {MANAGEMENTNODE.UUID} from the workflow execution table at 704. In the workflow for a monitoring path which is incomplete due to node failure, the {MANAGEMENTNODE.UUID} is found by both the non-handling and handling management nodes 106 in the workflow execution table at 705. Each management node 106 then checks to see whether the retrieved {MANAGEMENTNODE.UUID} matches the {MANAGEMENTNODE.UUID} of that management node 106 at 706. Each non-handling and handling management node 106 determines whether the {MANAGEMENTNODE.UUID} of the retrieved workflow does not match the {MANAGEMENTNODE.UUID} associated with the management node 106 at 706. Then each management node 106 determines whether the appropriate, handling management node 106 associated with that {ExecutionID} is live at 709. Each of the management nodes 106 determines whether the appropriate management node 106, associated with that {ExecutionID}, is not live because in this workflow that management node 106 has crashed and is not restarted. Each of the management nodes 106, handling and non-handling, then determines whether it should handle the current request at 707.

At this point, the workflow from the non-handling and handling management nodes 106 diverges. Any non-handling management node 106 determines that it should not handle the request, and consequently it discards the request at 711. However, handling management nodes 106 determine that the request should be handled, and any handling management node 106 responds appropriately at 710. In some examples, a handling management node 106 responding to the request creates a report which is sent to the intermediate node 110 via the load balancer 202. In some examples, the report indicates that the workflow execution was restarted, which operation the handling management node 106 is currently performing, the time spent on the current operation, completed operations, remaining operations, time spent on the workflow, etc. In other examples, the report is a general error, a timeout error, or a completion report.

Monitoring Path when the ExecutionID is Invalid

At 701, both the handling and non-handling management nodes 106 extract the {ExecutionID} values from the request transmitted by the load balancer 202 via the monitoring queue 206. In this workflow, the {ExecutionID} from the request is not in the memory associated with either the handling or the non-handling management nodes 106 at 702. In some examples, this is because the {ExecutionID} is invalid. Since the {ExecutionID} is not in memory for the management nodes 106, both the non-handling and handling management nodes 106 attempt to retrieve the {MANAGEMENTNODE.UUID} from the workflow execution table at 704. However, since the {ExecutionID} is invalid in this example, the {MANAGEMENTNODE.UUID} is not found by either the non-handling or the handling management nodes 106 at 705. Because the {MANAGEMENTNODE.UUID} was not found at 705, the management nodes determine whether the request should be handled at 707.

If the management node 106 is a handling management node, one to which the workflow applies, it handles the request and responds to it at 710. In some examples, a handling management node 106 responding to the request generates a report which is sent to the intermediate node 110 via the load balancer 202. In some examples, the report indicates that the workflow was restarted, which operation the handling management node 106 is currently performing, the time spent on the current operation, completed operations, remaining operations, time spent on the workflow, etc. However, if the management node 106 determines the request does not apply to it (e.g., that it is a non-handling management node 106), the non-handling management node discards the request at 711.

Figure 8:
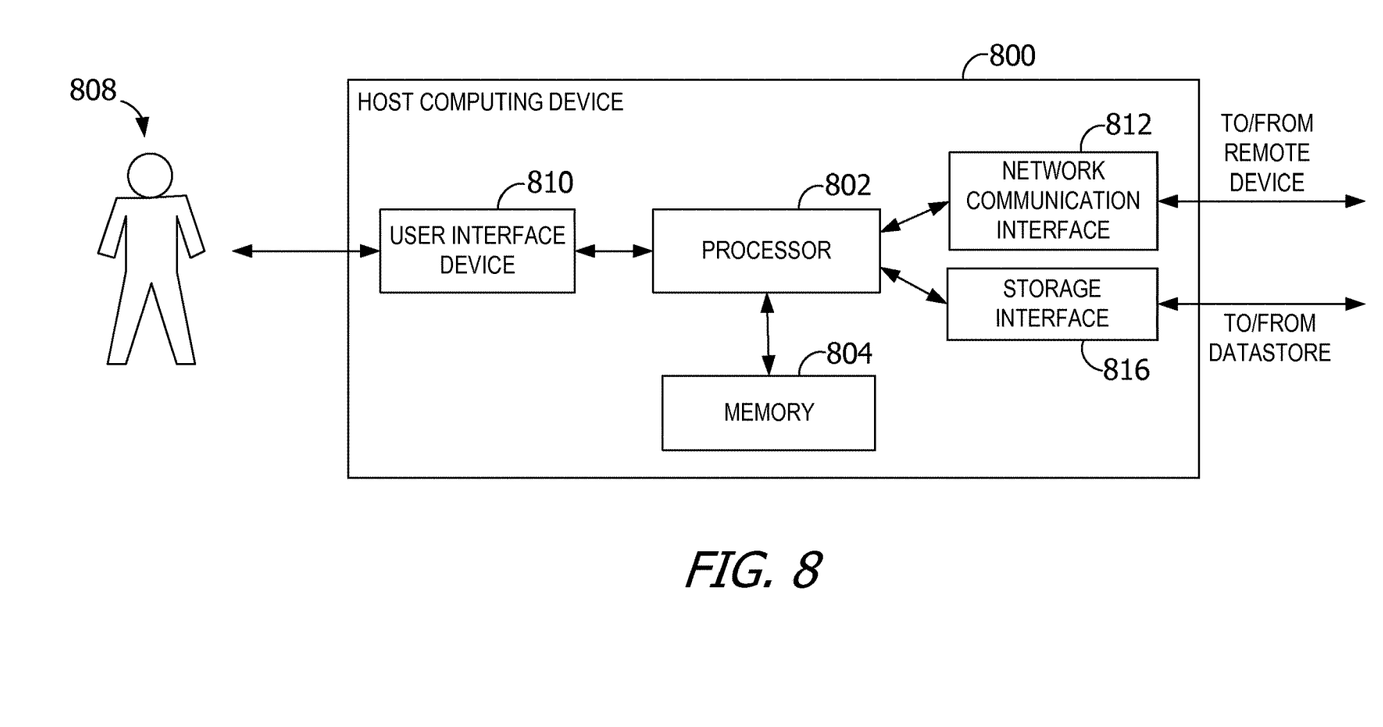
FIG. 8 is a block diagram of an exemplary host computing device upon which virtual machine (VMs) are instantiated.

FIG. 8 is a block diagram of an example host computing device 800. Host computing device 800 includes a processor 802 for executing instructions. In some examples, executable instructions are stored in a memory 804. Memory 804 is any device allowing information, such as executable instructions and/or other data, to be stored and retrieved. For example, memory 804 may include one or more random access memory (RAM) modules, flash memory modules, hard disks, solid state disks, and/or optical disks.

Host computing device 800 may include a user interface device 810 for receiving data from a user 808 and/or for presenting data to user 808. User 808 may interact indirectly with host computing device 800 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 808, while another device (e.g., a presentation device) operates to present data to user 808. In other examples, user interface device 810 has a single component, such as a touch screen, that functions to both output data to user 808 and receive data from user 808. In such examples, user interface device 810 operates as a presentation device for presenting information to user 808. In such examples, user interface device 810 represents any component capable of conveying information to user 808. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 802 and configured to be operatively coupled to an output device, such as a display device or an audio output device.

Host computing device 800 also includes a network communication interface 812, which enables host computing device 800 to communicate with a remote device (e.g., another computing device) via a communication medium, such as a wired or wireless packet network. For example, host computing device 800 may transmit and/or receive data via network communication interface 812. User interface device 810 and/or network communication interface 812 may be referred to collectively as an input interface and may be configured to receive information from user 808.

Host computing device 800 further includes a storage interface 816 that enables host computing device 800 to communicate with one or more storage devices, which store virtual disk images, software applications, and/or any other data suitable for use with the methods described herein. In example examples, storage interface 816 couples host computing device 800 to a storage area network (SAN) (e.g., a Fibre Channel network) and/or to a network-attached storage (NAS) system (e.g., via a packet network). The storage interface 816 may be integrated with network communication interface 812.

Figure 9:
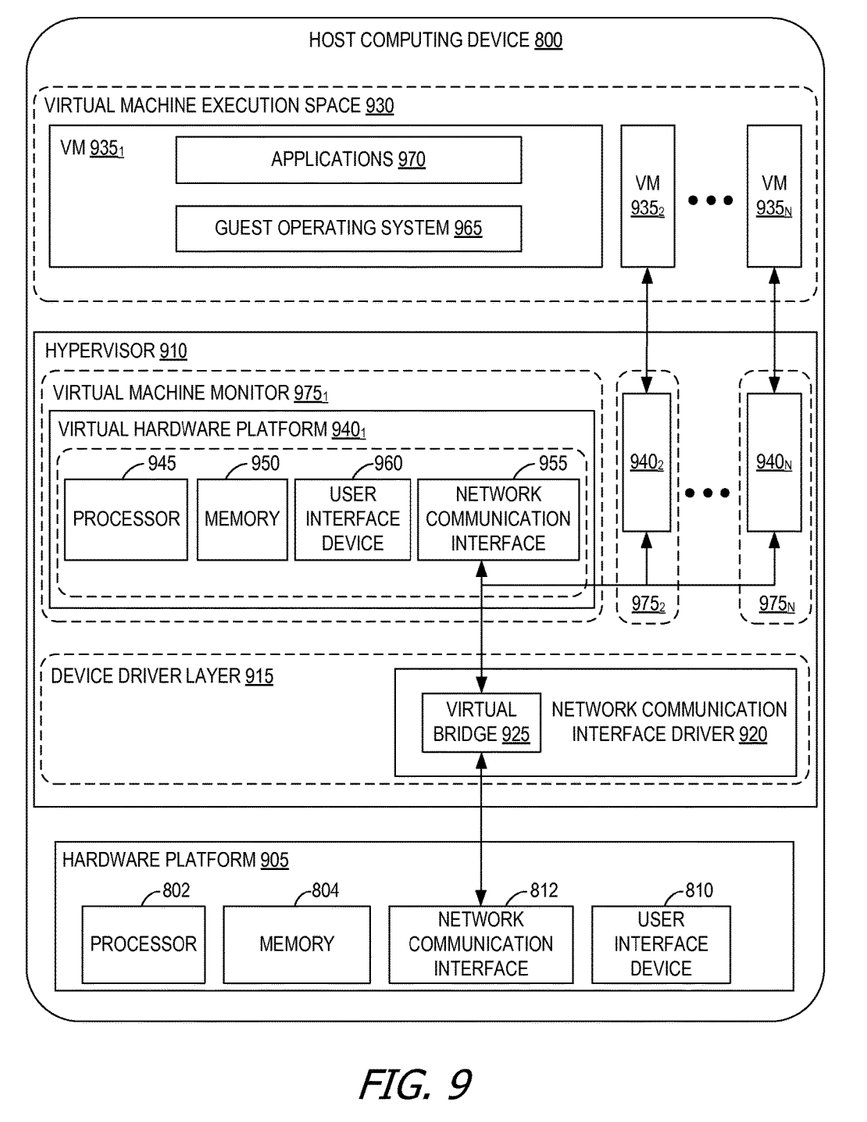
FIG. 9 is a block diagram of VMs that are instantiated on a host computing device, that are monitored in accordance with the disclosed method.

FIG. 9 depicts a block diagram of virtual machines $935_1$, $935_2 \ldots 935_N$ that are instantiated on host computing device 800. Host computing device 800 includes a hardware platform 905, such as an x86 architecture platform. Hardware platform 905 may include processor 802, memory 804, network communication interface 812, user interface device 810, and other input/output (I/O) devices, such as a presentation device 806 (shown in FIG. 8). A virtualization software layer, also referred to hereinafter as a hypervisor 910, is installed on top of hardware platform 905.

The virtualization software layer supports a virtual machine execution space 930 within which multiple virtual machines (VMs $935_1$-$935_N$) may be concurrently instantiated and executed. Hypervisor 910 includes a device driver layer 915, and maps physical resources of hardware platform 905 (e.g., processor 802, memory 804, network communication interface 812, and/or user interface device 810) to "virtual" resources of each of VMs $935_1$-$935_N$ such that each of VMs $935_1$-$935_N$ has its own virtual hardware platform (e.g., a corresponding one of virtual hardware platforms $940_1$-$940_N$), each virtual hardware platform having its own emulated hardware (such as a processor 945, a memory 950, a network communication interface 955, a user interface device 960 and other emulated I/O devices in VM $935_1$). Hypervisor 910 may manage (e.g., monitor, initiate, and/or terminate) execution of VMs $935_1$-$935_N$ according to policies associated with hypervisor 910, such as a policy specifying that VMs $935_1$-$935_N$ are to be automatically restarted upon unexpected termination and/or upon initialization of hypervisor 910. In addition, or alternatively, hypervisor 910 may manage execution VMs $935_1$-$935_N$ based on requests received from a device other than host computing device 800. For example, hypervisor 910 may receive an execution instruction specifying the initiation of execution of first VM $935_1$ from a management device via network communication interface 812 and execute the execution instruction to initiate execution of first VM $935_1$.

In some examples, memory 950 in first virtual hardware platform $940_1$ includes a virtual disk that is associated with or "mapped to" one or more virtual disk images stored on a disk (e.g., a hard disk or solid state disk) of host computing device 800. The virtual disk image represents a file system (e.g., a hierarchy of directories and files) used by first VM $935_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 915 includes, for example, a communication interface driver 920 that interacts with network communication interface 812 to receive and transmit data from, for example, a local area network (LAN) connected to host computing device 800. Communication interface driver 920 also includes a virtual bridge 925 that simulates the broadcasting of data packets in a physical network received from one communication interface (e.g., network communication interface 812) to other communication interfaces (e.g., the virtual communication interfaces of VMs $935_1$-$935_N$). Each virtual communication interface for each VM $935_1$-$935_N$, such as network communication interface 955 for first VM $935_1$, may be assigned a unique virtual Media Access Control (MAC) address that enables virtual bridge 925 to simulate the forwarding of incoming data packets from network communication interface 812. In an example, network communication interface 812 is an Ethernet adapter that is configured in "promiscuous mode" such that all Ethernet packets that it receives (rather than just Ethernet packets addressed to its own physical MAC address) are passed to virtual bridge 925, which, in turn, is able to further forward the Ethernet packets to VMs $935_1$-$935_N$. This configuration enables an Ethernet packet that has a virtual MAC address as its destination address to properly reach the VM in host computing device 800 with a virtual communication interface that corresponds to such virtual MAC address.

Virtual hardware platform $940_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 965 in order to execute applications 970 for an instantiated VM, such as first VM $935_1$. Virtual hardware platforms $940_1$-$940_N$ may be considered to be part of virtual machine monitors (VMM) $975_1$-$975_N$ that implement virtual system support to coordinate operations between hypervisor 910 and corresponding VMs $935_1$-$935_N$. Those with ordinary skill in the art will recognize that the various terms, layers, and categorizations used to describe the virtualization components in FIG. 9 may be referred to differently without departing from their functionality or the spirit or scope of the disclosure. For example, virtual hardware platforms $940_1$-$940_N$ may also be considered to be separate from VMMs $975_1$-$975_N$, and VMMs $975_1$-$975_N$ may be considered to be separate from hypervisor 910. One example of hypervisor 910 that may be used in an example of the disclosure is included as a component in VMware's ESX brand software, which is commercially available from VMware, Inc.

Additional Examples

The following scenarios are merely exemplary and not intended to be limiting in any way.

In some examples, multiple REST API calls are made to execute the operations described above. In some examples, APIs are used to monitor workflows in execution status (e.g., GET ${baseUrl}/execution/{executionID}) and workflows which have finished execution (e.g., GET ${baseUrl}/executionHistory/{executionID}). Additional extensions are, in some examples, defined to separate different message routing mechanisms. As an example, in a system such as CAM by VMware, INc., service.name: cam-monitor, routingKey: cam.monitor, and exchange: systemExchange. When the CAM master starts, a new queue is declared (e.g.SystemExchange-hcs.api.extension-{hcs.UUID}). Subsequently, in some examples, the new queue is bound to routingKey "cam.monitor" with a new consumer which applies the filter which either discards or handles incoming messages. In order to route the monitoring request appropriately, a monitoring API is utilized (e.g., GET /api/cam/monitor/recoveryPlan/{recoveryPlanId}/execution/{executionId}). Authorization for monitoring execution queries is, in some examples, performed via APIs (e.g., GET recoveryPlanID, GET orgID, query recoveryPlanEntity, etc.).

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for monitoring multi-step workflow execution across distributed nodes. For example, the elements illustrated in FIGS. 1, 2, 3, 8 and/or 9, such as when encoded to perform the operations illustrated in FIGS. 4, 5, 6, and/or 7, constitute exemplary means for receiving a monitoring request from a load balancer, exemplary means for comparing an execution ID of the monitoring request to an execution ID of a workflow currently executing on the management nodes, exemplary means for disregarding the monitoring request if the execution IDs are not the same, and exemplary means for performing the monitoring request if the execution IDs are the same.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computing system for monitoring multi-step workflows, said system comprising:
   an intermediate node;
   a plurality of queues;
   a plurality of management nodes;
   a load balancer that is stored in the memory and, when executed by a processor, monitors multi-step workflows by:
      receiving a plurality of requests from the intermediate node for one or more operations to be performed by one or more nodes of the plurality of management nodes;
      if at least one request of the plurality of received requests is a monitoring request, transmitting the at least one request to a plurality of monitoring queues of the plurality of queues, each associated with at least one of the plurality of management nodes; and
      if the at least one request is a non-monitoring request, transmitting the at least one request to a single non-monitoring queue of the plurality of queues, associated with each of the plurality of management nodes;
   the plurality of management nodes which, when executed by a processor, each processes queued requests by:
      accessing at least one of the queued requests;
      if the accessed request is a non-monitoring request, performing the accessed request;
      if the accessed request is a monitoring request, performing the accessed request only if the accessed request is from the monitoring queue associated with the management node; and
      transmitting a report indicating a success or failure of the accessed request to the load balancer, wherein the load balancer updates the intermediate node.

2. The computing system of claim 1, wherein each of the monitoring queues is associated with one of the plurality of management nodes.

3. The computing system of claim 1, further comprising an application programming interface (API) for establishing the plurality of monitoring queues and the single non-monitoring queue.

4. The computing system of claim 1, wherein the plurality of management nodes send the report to the intermediate node via the load balancer, the report indicating at least one of success, that the operation was already performed, a timeout error, or a general error.

5. The computing system of claim 1, wherein the received request comprises a series of operations and an execution identifier (ID).

6. The computing system of claim 5, wherein the execution ID identifies a workflow transmitted by the intermediate node.

7. A non-transitory computer-readable medium including instructions that, when executed by a load balancer, monitor multi-step workflows executing on a plurality of management nodes, the instructions comprising:
   receiving a plurality of requests from an intermediate node to be performed by at least one of the plurality of management nodes;
   classifying the received plurality of requests as monitoring or non-monitoring;
   transmitting, by way of a plurality of queues each associated with at least one of the plurality of management nodes, the requests to the plurality of management nodes based on said classifying such that each of the plurality of management nodes performs monitoring requests, received via an associated monitoring queue of the plurality of queues, relating only to workflows executing on the management node and each of the plurality of management nodes performs non-monitoring requests received via a non-monitoring queue of the plurality of queues;
   receiving a plurality of reports from the plurality of management nodes, the reports indicating success or failure of at least one of the plurality of requests; and
   transmitting the received plurality of reports to the intermediate node.

8. The non-transitory computer-readable medium of claim 7, wherein only the first-received report for one of the plurality of requests is transmitted to the intermediate node.

9. The non-transitory computer-readable medium of claim 7, wherein transmitting the requests to the plurality of management nodes comprises selecting one of the plurality of management nodes through a selection method including at least one of round robin, an algorithm, or idleness of each of the plurality of management nodes.

10. The non-transitory computer-readable medium of claim 7, further comprising:
   waiting for a report from the plurality of management nodes for a period of time; and
   upon determining that no report is received during the period of time, transmitting a timeout error to the intermediate node.

11. The non-transitory computer-readable medium of claim 7, wherein transmitting the received plurality of reports to the intermediate node comprises transmitting the received plurality of reports for display to a user in a user interface.

12. The non-transitory computer-readable medium of claim 7, wherein classifying the received plurality of requests comprises evaluating a payload of the request.

13. The non-transitory computer-readable medium of claim 7, wherein the computer-executable instructions further cause the load balancer, upon determining that a request is a non-monitoring request, to transmit the request to a particular one of the plurality of management nodes.

14. The non-transitory computer-readable medium of claim 7, wherein the computer-executable instructions further cause the load balancer, upon determining that a request is a monitoring request, to transmit the request to each of the plurality of management nodes.

* * * * *